July 14, 1936.   T. PETERSEN   2,047,329
PUMP OR THE LIKE AND DRIVING MEANS THEREFOR
Filed Feb. 2, 1933
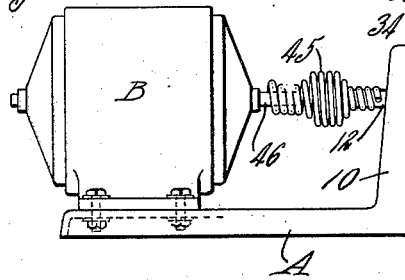
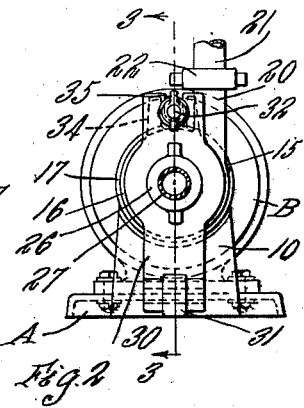
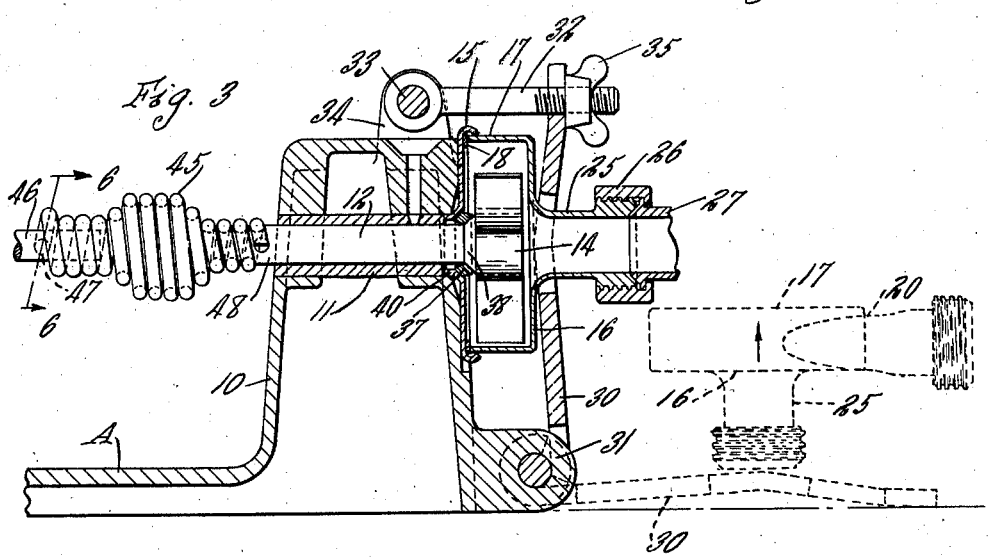
INVENTOR.
Thorvald Petersen
by Parker, Prochnow & Farmer
ATTORNEYS Patented July 14, 1936

2,047,329

UNITED STATES PATENT OFFICE 2,047,329

PUMP OR THE LIKE AND DRIVING MEANS THEREFOR

Thorvald Petersen, Erie, Pa., assignor to R. G. Wright & Co., Buffalo, N. Y.

Application February 2, 1933, Serial No. 654,904

8 Claims. (Cl. 64—15)

This invention relates to pumps and other rotary driven devices, and more particularly to pumps of this kind which are constructed so as to be readily taken apart and assembled for cleaning, and to driving means therefor which facilitate assembly and taking apart of the pump or other driven device.

In centrifugal pumps, such, for example, as are used in dairies or for pumping of materials which require cleanliness in the handling of the same, it is very necessary to provide a pump which can be quickly taken apart for thorough cleaning. This invention is illustrated in the drawing as applied to pumps of this kind, although it is not intended to limit the invention for use in connection with such pumps for handling of liquids which require extreme cleanliness, since the construction described is also applicable to pumps for other purposes and to driven devices other than pumps.

The objects of this invention are to provide a pump of improved construction in which the parts are arranged to be readily assembled, and again taken apart; also to provide a pump of this kind in which both the impeller and its shaft can be removed from the stationary parts of the pump; also to provide a rotary driven device with a connection between its rotary member and the driving means therefor to facilitate the removal of the rotary member; also to provide an improved flexible connection between rotary, driving and driven members; also to provide a resilient driving connection or coupling between driving and driven rotary members which exerts endwise force against the driven member; also to provide a flexible coupling member of this kind with means for providing a quickly attachable and detachable connection with a driven rotary member; also to provide a rotary pump with a coupling member for connecting the pump shaft with a driving shaft, which coupling member at the same time serves to form a tight joint between the pump shaft and the housing; also to improve the construction of rotary pumps and driving connections between driving and driven rotary members in other respects hereinafter specified.

In the accompanying drawing:

Fig. 1 is a side elevation of a centrifugal pump and a flexible driving connection embodying this invention, the pump being shown as directly connected with an electric motor.

Fig. 2 is an end elevation thereof.

Fig. 3 is a sectional elevation thereof on an enlarged scale, on line 3—3, Fig. 2.

Fig. 4 is a perspective view of the impeller and its shaft.

Fig. 5 is a fragmentary elevation, partly in section, showing the end of the pump shaft and its connection with the flexible coupling member.

Fig. 6 is a transverse section, on line 6—6, Fig. 3, showing the connection between the motor shaft and the flexible coupling member.

Fig. 7 is a side elevation of a packing ring or gasket employed between the rotary member or shaft of the pump and pump housing.

The invention is illustrated in the drawing as embodied in a centrifugal pump, and while the same is particularly well adapted for use with a rotary pump which can be readily assembled and taken apart, yet it is to be understood that this invention is applicable to other driven devices or apparatus. The pump, in the construction illustrated, is mounted on a base member A having an upwardly extending part 10 forming a support for the pump or other driven device and a bearing for the driven shaft. In the construction shown, the base also supports a motor or other driving device B which may be of any suitable construction and which does not form a part of this invention.

The upright bearing member of pump support 10 may be provided with a bearing 11 of any suitable or desired construction for the driven shaft 12, on which in the construction illustrated, an impeller 14 is secured, and the side of the bearing support 10 opposite to the motor B is provided with a face suitable to receive a part 15 of the pump housing. This housing includes another part having an end wall 16 arranged at the opposite side of the impeller from the end wall or part 15, and a transverse or circumferential wall 17, preferably formed integrally with the end wall 16. The edges of the transversely extending wall 17 preferably cooperate with a suitable packing gasket or sealing member 18, which may for example be in the form of a rubber ring for forming a seal between the two parts of the pump housing. The transverse wall 17 of the pump housing is provided with the usual tangential discharge passage 20, which may be connected with a tube 21 by means of a coupling 22 which is preferably made to form a quickly detachable connection between the discharge passage 20 and the tube 21. The end wall 16 of the pump housing is provided with an inlet passage 25 engaging with a similar quickly detachable coupling member 26 for connecting the same with an inlet pipe 27. Similar connections between the pump and the inlet and discharge pipes have heretofore been used, and the particular connections herein shown do not constitute a part of this invention.

In order to clamp the two parts of the housing together and against the upright extension 10 of the base, a suitable clamping member 30 is employed in the construction shown, although this clamping member may be replaced by any other suitable means for securing these parts together. In the construction shown, the clamping member 60

30 is pivoted near its lower end to a lug 31 extending outwardly from the base, and the upper end cooperates with a clamping bolt 32 pivoted at 33 between two upwardly extending lugs 34 of the bearing extension 10 of the base. A thumb screw 35 cooperating with the bolt 32 serves to force the clamping member 30 against the end wall 16 of the housing to urge this part of the housing toward the housing part 15 and to form a seal with the packing ring 18. The clamping member also holds the pump housing part 15 against the outer face of the upright extension 10. Upon unscrewing the thumb screw 35, the clamping bolt 32 may be disengaged from the clamping member 30 which may then be swung downwardly into the position shown in broken lines in Fig. 3, this, of course, being done after the coupling member 26 has been disconnected from the inlet passage 25 of the pump housing. When the clamping member is in this position, the part of the pump housing engaged thereby may be moved upwardly out of engagement with the clamping member, as indicated by the arrow in Fig. 3. Any other means for detachably securing the parts of the housing together may be employed in connection with my invention.

In pumps heretofore made, it has been common practice to mount the impeller removably on that end of the impeller shaft which extends into the pump housing. This, however, made it impossible to thoroughly clean or sterilize the end of the impeller shaft which extended into the pump housing, and also the packing between the impeller shaft and the pump housing could not be thoroughly cleaned or disinfected, and consequently, in handling milk or similar fluids, contamination of the fluid may readily result from bacteria or other foreign matter adhering to this end of the pump shaft, or to the packing. In accordance with this invention, I have rigidly mounted the impeller on the end of the impeller shaft and have formed a readily removable drive connection between the other end of the impeller shaft and the motor, so that the impeller, together with the shaft may be withdrawn from the shaft bearings for cleaning or sterilization. For this purpose, the impeller may be welded or otherwise permanently secured to the impeller shaft by means of a smooth or continuous connection free from slots, clearances, or grooves, which might harbor bacteria, or foreign matter. Preferably, I also provide a gasket or seal between the impeller or its shaft and the housing member 15, which packing may be removed with the impeller and with the shaft, and which can also be sterilized, a packing 37 being shown for this purpose on the construction illustrated. This sealing or packing member can be made of any suitable bearing material capable of operating without oil and which can be readily cleaned or sterilized and has an inclined face engaging a beveled or similarly inclined face 38 formed on the impeller shaft or hub of the impeller, and the opposite face of the gasket is provided with a face 39 which may also be inclined or beveled, as in the construction shown, and which engages with a correspondingly inclined or beveled bearing face formed on the portion 15 of the housing. This part of the housing beyond the bearing face is provided with a tubular extension or sleeve 40 having a relatively large central aperture through which the shaft may readily pass. The tubular extension may also fit within the bearing recess of the bearing support 10 to correctly center the pump housing relatively to the axis of the driven shaft 12.

In order to form a liquid-tight seal by means of the combined packing or gasket and bearing member 37, it is, of course, necessary to exert force on the impeller or shaft toward the combined gasket and bearing member. I prefer to provide means for applying this force outside of the pump housing, so that the pressure applying means will not be in contact with the liquid which is being pumped. I have accordingly provided combined means for exerting this force against the sealing member and simultaneously forming a quickly detachable connection with the driven shaft 12, although it will be obvious that other means than those described may be employed in connection with my invention. As shown in the drawing, I provide a spring coupling member 45 which may, for example, be made of a length of resilient material bent or formed into a coil spring, one end of which may extend about the motor shaft 46 and form a permanent connection therewith. For example, the motor shaft may be provided with a radially extending hole or aperture 47 shown in broken lines in Fig. 3, into which one end of the spring extends. The other end of the spring coupling preferably has a threaded engagement with a threaded end portion 48 of the pump shaft. A shallow hole 49 is preferably drilled at the end of the threaded portion to form an abrupt stop for that end of the coil spring coupling which engages the pump shaft. The thread is formed around the end of the pump shaft in such a manner that the direction of rotation of the motor shaft will tend to cause the end of the flexible coupling member to screw itself upon the threaded end 48 of the pump shaft, and the coupling member 45 is so formed that when in driving position on the pump shaft 12, it will exert a pull on the pump shaft in a direction to urge the shaft and impeller to press against the seal 37. The particular connection between the flexible coupling member and the driven shaft 12, therefore, serves the further purpose of forming a quickly detachable and attachable connection with the driven shaft. After unclamping the housing, it is only necessary to give the pump impeller a few turns in a direction to unscrew the threaded end 48 of the pump shaft from the flexible coupling member 45, whereupon the pump shaft may be withdrawn from the bearing 11. With the withdrawal of the impeller and pump shaft, the packing member 37 is also removed with the pump shaft, and the housing member 15 may be removed at the same time. All of these parts can thus be thoroughly cleaned or sterilized, and when again assembled, there is no part in the pump with which the milk or other liquid contacts which will not have been cleaned or sterilized. Contamination of the liquid during its passage through the pump can, therefore, be entirely prevented by means of the pump described.

The flexible coupling member described is of simple and inexpensive construction, being merely a coil of spring wire, and has the several advantages of exerting a force lengthwise of the axis of the driven member or shaft 12, which in the particular construction shown, serves the purpose of insuring a tightly-fitting seal between the pump housing and the impeller shaft, so that no liquid can escape from the pump along the shaft, and no lubricant or foreign material can enter into the pump from the shaft bearing. The flexible coupling member has the further advantage of forming a readily detachable and attachable connection with the driven member by its screw connection with the shaft 12.

In connecting the driven member or shaft 12 with the flexible coupling, the helical groove 46 on the end of the shaft 12 is cut in such a manner that when the end of the coil spring reaches the groove, the spring will exert the desired force axially of the shaft 12, and also the torque of the motor will tend to screw the spring to the end of the helical groove, so that the spring coupling will at all times be retained under tension.

In addition to these advantages, the flexible coupling has, of course, the added advantage of transmitting power from the driving to the driven shafts or members, regardless of whether or not the same are in correct alinement. This type of coupling also facilitates the starting of the motor in case of a heavy load on the driven member, since the initial starting movement of the motor may be entirely absorbed by the yielding coupling member.

I claim as my invention:

1. In a pump or the like, a housing having an aperture in a wall thereof, a shaft extending through said aperture into said housing and having within the housing a shoulder facing outwardly, a bearing ring surrounding said shaft within said housing and compressible between said shoulder and said housing to seal said aperture, a driving member aligned approximately endwise with said shaft, and a spring connecting the adjacent ends of said driving member and said shaft for transmitting a driving torque from said member to said shaft and urging said shaft in a direction outwardly of said housing to compress said ring against said housing and seal the opening in the housing through which the shaft extends.

2. In a pump or the like, a housing having an aperture in a wall thereof, a shaft extending through said aperture into said housing, and within said housing having a tapered shoulder facing said aperture, a bearing ring surrounding said shaft within said housing and compressible between said shoulder and said housing to seal said aperture, and means including a spring connected to the outer end of said shaft for imparting a resilient rotary driving torque to said shaft and concomitantly urging said shaft in an endwise direction to compress said bearing ring and seal the opening in said housing through which said shaft extends.

3. In a pump or the like, a housing having an aperture in a wall thereof, a shaft extending through said aperture in said housing and having within the housing a tapered shoulder facing said aperture, the inner face of said housing surrounding said aperture being outwardly convergent, a sealing ring surrounding said shaft, and disposed between said tapered shoulder and said convergent wall, and means including a spring connected to said shaft for imparting to said shaft a rotary driving torque and concomitantly an endwise movement in a direction to compress said ring and seal the opening in said housing through which said shaft extends.

4. In a pump or the like, a housing having an aperture in a wall thereof, a shaft extending through said aperture into said housing and having within the housing a tapered shoulder facing said aperture, the marginal zone of said housing surrounding and defining said aperture, being also tapered and facing said shoulder, a bearing ring, approximately rhomboidal in cross-section, surrounding said shaft and compressed between said shoulder and said marginal zone for sealing the aperture of the housing through which said shaft extends, and means including a spring connected to the outer end of said shaft for imparting to said shaft a rotary driving torque and concomitantly urging said shaft endwise in a direction to compress said ring.

5. In a pump or the like, a housing having an aperture in a wall thereof, a shaft extending through said aperture into said housing, said shaft having a shoulder adjacent to said aperture, an annular bearing ring surrounding said shaft and compressible between said shoulder and the portion of said wall along said aperture, and means including a spring connected to said shaft for imparting to said shaft a resilient rotary driving torque and also an endwise movement in a direction to compress said ring and seal said aperture around said shaft.

6. In a pump or the like, a housing having an aperture in a wall thereof, a shaft extending through said aperture into said housing, said shaft having a tapered shoulder adjacent to said aperture, the portion of said wall around said aperture and facing said tapered shoulder being also similarly tapered, an annular bearing ring, approximately rhomboidal in cross-section, surrounding said shaft and disposed between said tapered shoulder and tapered portion of said wall around said aperture, and means including a helical spring coupled to said shaft for imparting to the latter a rotary driving torque and also an endwise movement in a direction to compress said ring between said wall and shoulder.

7. In a pump or the like, a housing having an aperture in a wall thereof, a shaft extending through said aperture into said housing, a waterless bearing ring surrounding said shaft within said housing and compressed between said shaft and housing to seal said aperture, the abutting surfaces of said shaft, said ring and the portion of the housing against which the ring is compressed, being at an inclination to the shaft axis of less than 90°, whereby the ring acts as a combined end thrust and radial bearing and seals said aperture, and means for imparting a rotary driving torque to said shaft and also yieldingly urging it endwise in a direction to compress said ring and seal said aperture.

8. In an improved sealing device, a housing having an aperture in a wall thereof, a shaft extending through said aperture into said housing and a bearing ring surrounding said shaft within said housing and compressed between said shaft and housing to seal said aperture, the abutting surfaces of said shaft, said ring and the portion of the housing against which the ring is compressed, being at an inclination to the shaft axis of less than 90°, whereby the ring acts as a combined end thrust and radial bearing and seals said aperture, and resilient means for imparting a rotary driving torque to said shaft and also yieldingly urging it endwise in a direction to compress said ring and seal said aperture.

THORVALD PETERSEN.